(12) United States Patent
Jackowski et al.

(10) Patent No.: US 10,214,299 B2
(45) Date of Patent: Feb. 26, 2019

(54) LIGHT DETECTION AND RANGING (LIDAR) ICE DETECTION

(71) Applicant: The Boeing Company, Chicago, IL (US)

(72) Inventors: Jason J. Jackowski, Everett, WA (US); Steve G. Mackin, Bellevue, WA (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/639,975

(22) Filed: Jun. 30, 2017

(65) Prior Publication Data

US 2018/0079521 A1   Mar. 22, 2018

Related U.S. Application Data

(60) Provisional application No. 62/398,332, filed on Sep. 22, 2016.

(51) Int. Cl.
| | | |
|---|---|---|
| *B64D 45/00* | (2006.01) | |
| *G01B 11/24* | (2006.01) | |
| *G01S 17/02* | (2006.01) | |
| *G01S 17/42* | (2006.01) | |
| *G01S 17/89* | (2006.01) | |

(52) U.S. Cl.
CPC .............. *B64D 45/00* (2013.01); *G01B 11/24* (2013.01); *G01S 17/026* (2013.01); *G01S 17/42* (2013.01); *G01S 17/89* (2013.01)

(58) Field of Classification Search
CPC ........ G01B 11/24; G01S 17/026; B64D 45/00
USPC ................ 340/962, 963, 968, 969, 970, 583
See application file for complete search history.

(56) References Cited

U.S. PATENT DOCUMENTS

| | | | |
|---|---|---|---|
| 5,313,202 A | 5/1994 | Hansman, Jr. et al. | |
| 5,523,959 A | 6/1996 | Seegmiller | |
| 5,589,822 A | 12/1996 | Stern | |
| 5,617,076 A * | 4/1997 | Stern ...................... | B64D 15/20 340/583 |
| 5,760,711 A | 6/1998 | Burns | |
| 5,838,239 A * | 11/1998 | Stern ...................... | B64D 15/20 340/583 |
| 5,921,501 A | 7/1999 | Pernick | |
| 6,010,095 A * | 1/2000 | Hackmeister .......... | B64D 15/20 244/134 F |
| 6,207,940 B1 | 3/2001 | Feher et al. | |

(Continued)

FOREIGN PATENT DOCUMENTS

| | | |
|---|---|---|
| GB | 2130158 | 5/1984 |
| GB | 2130158 A | 5/1984 |

(Continued)

OTHER PUBLICATIONS

Extended European Search Report dated Feb. 2, 2018 for EP application No. 17184132.3.

(Continued)

*Primary Examiner* — Tai T Nguyen
(74) *Attorney, Agent, or Firm* — Gates & Cooper LLP (57) ABSTRACT

Method and system to detect ice accumulation on ice prone surfaces of an aircraft. The method and system sweeps a Light Detection and Ranging (LIDAR) beam across ice prone surfaces to measure the shape of the ice prone surfaces. The change in shape of the ice prone surfaces indicates the presence of ice on the ice prone surface.

16 Claims, 12 Drawing Sheets

(56) References Cited

U.S. PATENT DOCUMENTS

| | | |
|---|---|---|
| 6,286,370 B1 | 9/2001 | Sinha |
| 6,371,411 B1 | 4/2002 | Breer et al. |
| 6,457,676 B1 | 10/2002 | Breer et al. |
| 6,642,490 B2 | 11/2003 | Feher |
| 6,688,558 B2 | 2/2004 | Breer et al. |
| 6,819,265 B2 | 11/2004 | Jamieson et al. |
| 7,370,525 B1 | 5/2008 | Zhao et al. |
| 7,439,877 B1 | 10/2008 | Jarvinen |
| 7,933,002 B2 | 4/2011 | Halldorsson |
| 8,325,338 B1 | 12/2012 | Pope et al. |
| 8,462,354 B2 | 6/2013 | Barnes |
| 8,517,601 B2 | 8/2013 | Stothers et al. |
| 9,242,735 B1 | 1/2016 | Meis et al. |
| 9,429,680 B2 | 8/2016 | Grzych et al. |
| 9,469,408 B1 | 10/2016 | Elangovan et al. |
| 9,546,004 B1 | 1/2017 | Safai et al. |
| 9,676,485 B2 | 6/2017 | Stothers et al. |
| 9,696,238 B2 | 7/2017 | Bosetti et al. |
| 9,776,731 B1 * | 10/2017 | Lieberman ............ B64D 45/00 |
| 2004/0036630 A1 * | 2/2004 | Jamieson ............ B64D 15/20 340/962 |
| 2005/0087720 A1 | 4/2005 | Samuels et al. |
| 2005/0263646 A1 | 12/2005 | Nichols |
| 2010/0328644 A1 * | 12/2010 | Lu .................. G01S 7/4802 356/5.01 |
| 2012/0274938 A1 | 11/2012 | Ray |
| 2013/0113926 A1 | 5/2013 | Chen et al. |
| 2013/0320145 A1 | 12/2013 | McGillis et al. |
| 2014/0055611 A1 * | 2/2014 | Wong .................. H04N 5/2251 348/143 |
| 2014/0117106 A1 | 5/2014 | Acheson et al. |
| 2015/0108233 A1 | 4/2015 | Wright |
| 2015/0260099 A1 | 9/2015 | Gally et al. |
| 2016/0311542 A1 | 10/2016 | Mackin |
| 2016/0356180 A1 | 12/2016 | Bol |
| 2017/0008635 A1 | 1/2017 | Mackin et al. |
| 2017/0057618 A1 | 3/2017 | Khozikov et al. |
| 2017/0057644 A1 | 3/2017 | Khozikov et al. |
| 2017/0158336 A1 | 6/2017 | Meis et al. |
| 2017/0166314 A1 | 6/2017 | Meis et al. |
| 2017/0166777 A1 | 6/2017 | Berry et al. |
| 2017/0190431 A1 | 7/2017 | Dichek et al. |
| 2017/0204291 A1 | 7/2017 | Berry et al. |
| 2017/0210478 A1 | 7/2017 | Mackin |
| 2017/0233106 A1 | 8/2017 | Svanebjerg et al. |
| 2017/0283078 A1 * | 10/2017 | Loussides ............ G01S 17/89 |
| 2017/0313428 A1 | 11/2017 | Mackin et al. |
| 2018/0079511 A1 | 3/2018 | Mackin |
| 2018/0079512 A1 | 3/2018 | Jackowski et al. |

FOREIGN PATENT DOCUMENTS

| | | |
|---|---|---|
| WO | 99/16034 | 4/1999 |
| WO | 9916034 A1 | 4/1999 |

OTHER PUBLICATIONS

Extended European Search Report dated Nov. 7, 2017 for European Patent Application No. 17184089.5.

U.S. Appl. No. 15/639,917, Non Final Office Action dated Jul. 11, 2018.

U.S. Appl. No. 15/669,166, Non Final Office Action dated Jun. 14, 2018.

European Application Serial No. 17184132, European Search Report dated Feb. 2, 2018.

* cited by examiner

LIGHT DETECTION AND RANGING (LIDAR) ICE DETECTION

CROSS REFERENCE TO RELATED APPLICATIONS

This application claims the benefit under 35 U.S.C. Section 119(e) and commonly-assigned U.S. Provisional Patent Application No. 62/398,332, filed Sep. 22, 2016, by Jason J. Jackowski and Steve G. Mackin, entitled "LIGHT DETECTION AND RANGING (LIDAR) ICE DETECTION," which application is incorporated by reference herein.

BACKGROUND

The present disclosure relates to anti-ice systems, and more specifically, to a system for detecting ice.

Ice buildup on aerodynamic surfaces of aircraft can be problematic. For example, ice can build up on the leading edges of wings and/or engine nacelles. The ice can also disrupt the intended airflow over the aerodynamic surfaces, causing a loss of lift generated by the aerodynamic surface. A combination of design considerations of modern airfoils and modern certification requirements result in less ice tolerance, meaning that modern aircraft need to have more anti-ice capability than some conventional anti-icing technologies can provide. However, existing anti-ice technologies are complicated and/or expensive.

Conventional anti-ice systems that reduce (but do not eliminate) these effects are not sufficient for commercial service. Moreover, current ice detectors can only detect the presence of ice at sensor locations or indicate the aircraft is in potential icing conditions. Thus, there is no current method of accurately detecting the severity of ice accumulation on airplane surfaces.

What is needed, then, is a solution that detects the presence of ice on aerodynamic surfaces in a more comprehensive manner so that more ice can be removed more effectively from more locations on the aircraft's aerodynamic surfaces.

SUMMARY

To overcome the limitations described above, and to overcome other limitations that will become apparent upon reading and understanding the present specification, the present disclosure describes using a sweeping Light Detection and Ranging (LIDAR) system to measure ice accumulation on aerodynamic surfaces, including, but not limited to, a wing, a tail, or engine inlet of an aircraft.

In various examples, the LIDAR system includes a transmitter and a receiver placed on two distinct locations on the aircraft, such that the LIDAR system measures the shape of an aerodynamic surface on the aircraft in a sweeping manner to detect ice formation.

In various examples, the transmitter transmits a LIDAR beam to the aerodynamic surface, the receiver detects the LIDAR beam after the LIDAR beam has reflected off the aerodynamic surface, the LIDAR system measures the time of flight of the LIDAR beam between the transmitter and the receiver, and the LIDAR system uses the time of flight to measure the shape of the aerodynamic surface.

In various examples, the LIDAR system is positioned inside the aircraft's fuselage behind a window, the transmitter transmits the LIDAR beam through the window, and the receiver detects the LIDAR beam through the window after the LIDAR beam has reflected off the aerodynamic surface outside the fuselage.

In various examples, the LIDAR measurement shows the aerodynamic surface shape change with ice accumulation. In various examples, the LIDAR system measures variations of the time of flight in real time and uses the variations to measure changes in the shape of the aerodynamic surface, and the changes in the shape of the aerodynamic surface are associated with the ice formation on the aerodynamic surface. In various examples, the LIDAR system constantly measures the shape of the aerodynamic surface with real time real data.

In various examples, the LIDAR system is mounted on two-axis rotation mount so that the sweeping of the LIDAR beam is in two axes and provides a more complete analysis of the ice formation than an ice detector positioned on the aerodynamic surface.

In various examples, the LIDAR system informs the flight crew and/or a control system if ice is accumulating. In various examples, a flight deck indication system alerts flight crew when the ice detector detects ice.

In yet another example, and in response to the ice accumulation detected by the LIDAR system, ice protection measures are activated (e.g., manually or automatically) and/or a better flight level out of the icing conditions is implemented.

BRIEF DESCRIPTION OF THE SEVERAL VIEWS OF THE DRAWINGS

Referring now to the drawings in which like reference numbers represent corresponding parts throughout.

DETAILED DESCRIPTION

In the following, reference is made to particular aspects or examples presented in this disclosure. However, the scope of the present disclosure is not limited to specific described aspects or examples. Instead, any combination of the following features and elements, whether related to different aspects/examples or not, is contemplated to implement and practice contemplated aspects. Furthermore, although aspects and examples disclosed herein may achieve advantages over other possible solutions or over the prior art, whether or not a particular advantage is achieved by a given aspect or example is not limiting of the scope of the present disclosure. Thus, the following aspects, examples, features, and advantages are merely illustrative and are not considered elements or limitations of the appended claims except where explicitly recited in a claim(s).

The present disclosure describes a LIDAR system on the aircraft emitting a LIDAR beam, wherein the LIDAR system measures ice formation on an aerodynamic surface of the aircraft by sweeping the LIDAR beam on the aerodynamic surface.

LIDAR Installation Examples

Figure 1:
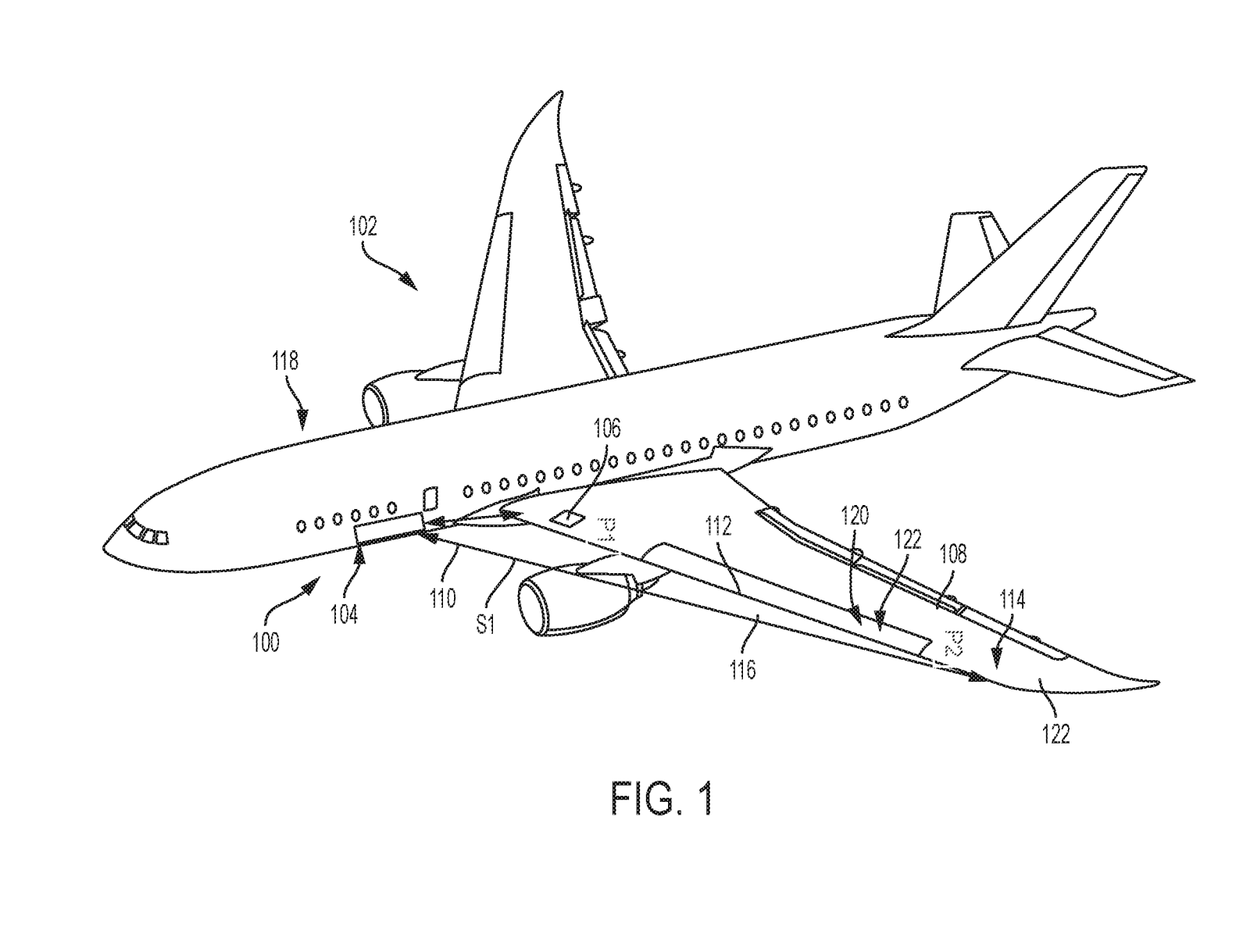
FIG. 1 shows installation of a LIDAR system to measure ice on an ice-prone wing leading edge according to various examples.

FIG. 1 illustrates an installation of an ice detector 100 on an aircraft 102, wherein the ice detector 100 includes a Light Detection and Ranging (LIDAR) system 104 measuring ice formation 106 on the aircraft's wing 108. The LIDAR system 104 emits a LIDAR beam 110 (e.g., a laser beam) sweeping S1 the wing leading edge 112 to determine the shape 114 of the wing leading edge 112, thereby determining if any ice is accumulating on the wing leading edge 112. The LIDAR system includes a transmitter transmitting the LIDAR beam 110 to the wing leading edge 112 and a receiver detecting the LIDAR beam's reflection (return beam) 116 from the wing leading edge 112.

In various examples, the LIDAR system 104 is positioned in the aircraft's fuselage 118 forward of the wing 108. In various examples, positioning of the LIDAR system 104 closer to the wing 108 allows an actuator in the LIDAR device 104 to sweep S the LIDAR beam 110 over a larger angle.

Also shown a porous panel 120 for distributing ice protection fluid in an anti-ice system 122. In various examples, the LIDAR system 104 monitors the functioning of the anti-ice system 122.

Figure 2:
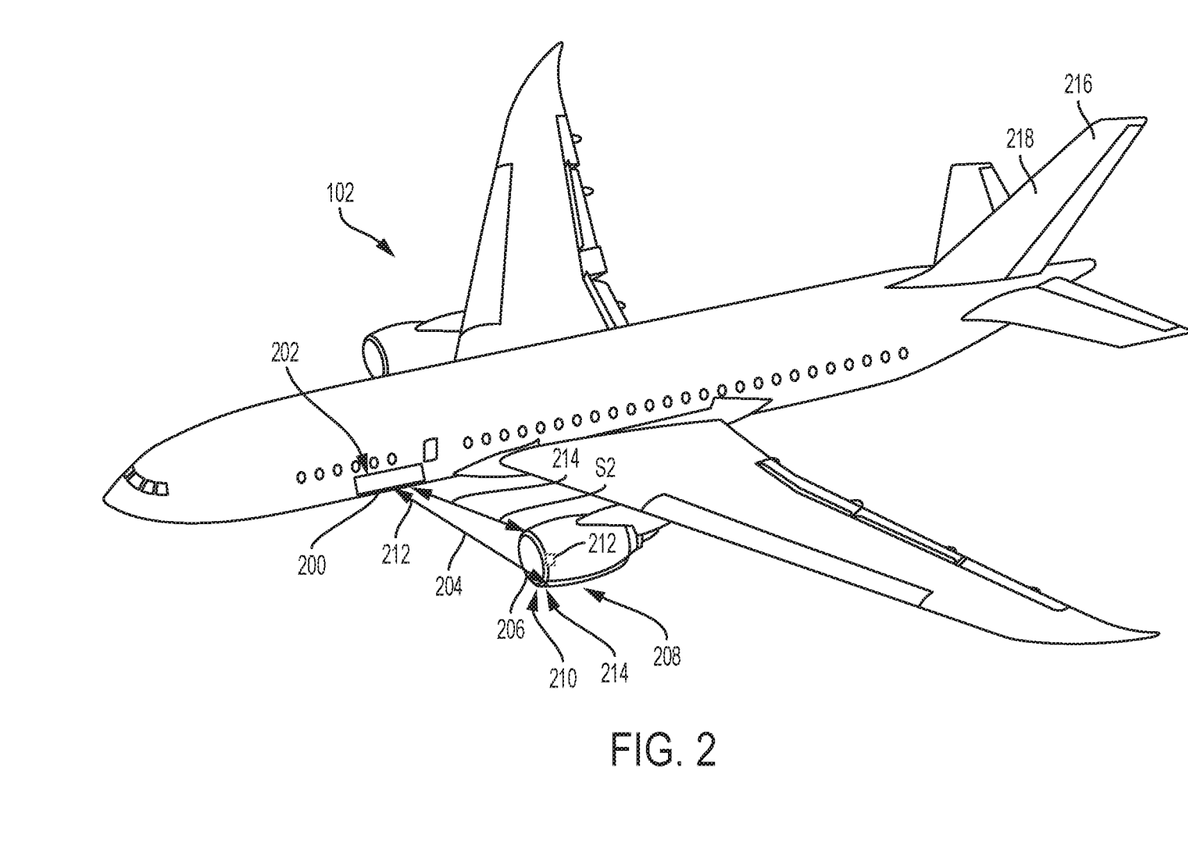
FIG. 2 illustrates installation of a LIDAR system to measure ice on an ice-prone engine inlet, according to various examples.

FIG. 2 illustrates installation of an ice detector 200 comprising a LIDAR system 202 emitting a LIDAR beam 204 sweeping S2 the engine inlet 206 (of the nacelle 208) to determine the shape 210 of the engine inlet 206 and if any ice 212 is accumulating on the engine inlet 206. The LIDAR system 202 includes a transmitter transmitting the LIDAR beam 204 to the engine inlet 206 and a receiver detecting the LIDAR beam's reflection 214 from the engine inlet 206.

More generally, the LIDAR system is mounted on the aircraft 102 so as to measure the shape of a range of aerodynamic surfaces 216 on the aircraft 102 in a sweeping manner, thereby detecting ice formation 212,106 on the aerodynamic surface 216. Examples of aerodynamic surfaces 216 include, but are not limited to, aerodynamic surfaces on a tail 218, a wing 108, and/or an engine inlet 206.

Figure 3:
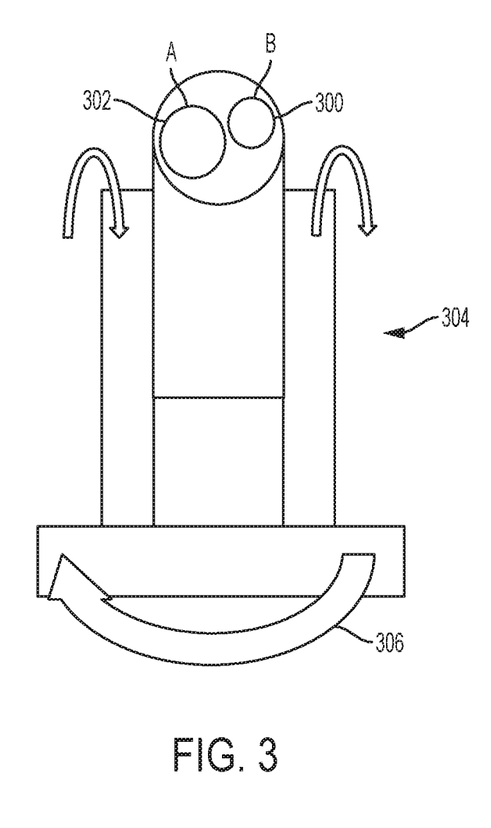
FIG. 3 illustrates a front view of a LIDAR system on a two axis mount, according to various examples.

FIG. 3 illustrates the LIDAR system 202, 104 includes a transmitter 300 and receiver 302 mounted on actuators (a two axis mount 304) that rotate 306, 308 around two axes to sweep the LIDAR beam 110, 204 over the aerodynamic surface 216, thereby detecting the ice 106,212. Using the actuators 304 to move or sweep the LIDAR beam 110, 204 across the aerodynamic surfaces 216 gives a more complete analysis of ice accumulations 106, 212 on the aerodynamic surfaces than an ice detector positioned on the aerodynamic surfaces. The transmitter 300 and receiver 302 are positioned at two different locations A, B on the mount 304 on the aircraft 102.

Figure 4:
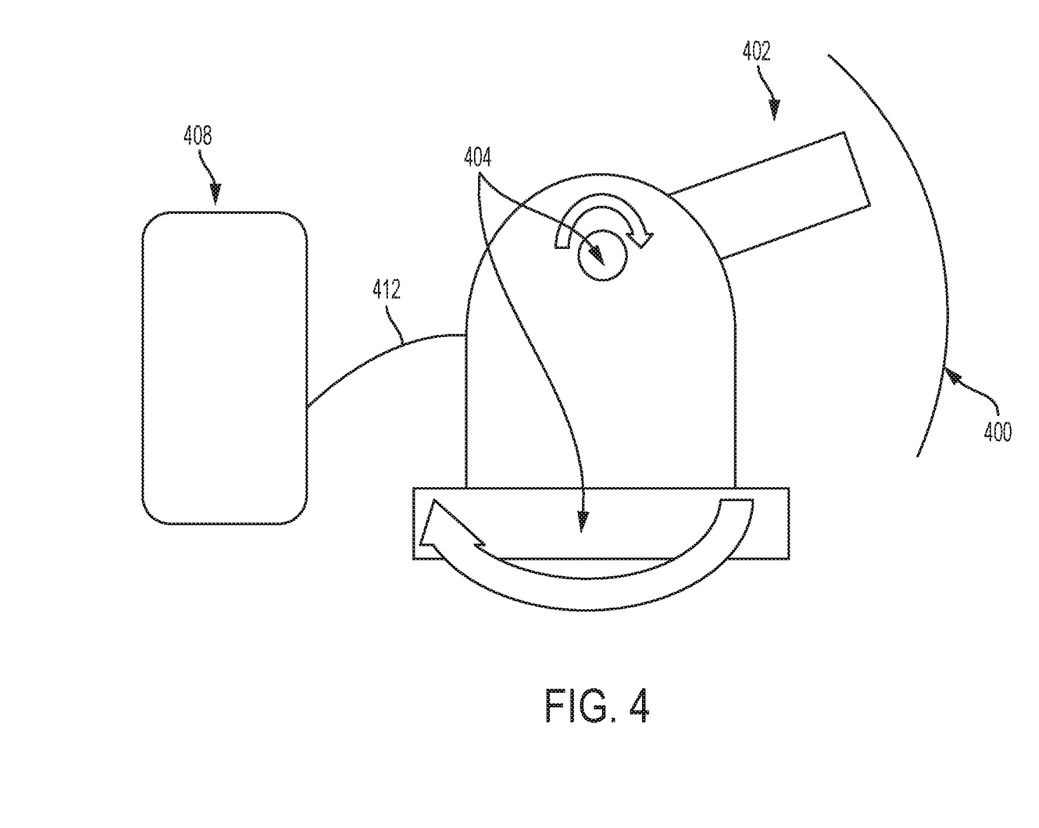
FIG. 4 illustrates a side view of the LIDAR system in FIG. 3 showing installation of the LIDAR system behind an aircraft window, according to various examples.

FIG. 4 illustrates installation of the LIDAR system 202, 104 inside the aircraft's fuselage 118 and behind an optical window 400. The LIDAR transmitter 300 and receiver 302 are mounted in a LIDAR transmitter and receiver housing 402. The housing 402 is mounted on a two axis mount 304 rotating the housing 402 around two axes 404 of rotation.

In various examples, the window 400 is flush with the aircraft fuselage 118. The transmitter 300 transmits the LIDAR beam 110, 204 through the window 400, and the receiver 302 detects the reflected LIDAR beam 214 through the window 400 after the LIDAR beam 204 has reflected off the aerodynamic surface 216 outside the fuselage 118.

FIG. 4 further illustrates the LIDAR system 104, 202 includes a computational unit 408 (including processors) connected 410 to the transmitter 300 and receiver 302. The computer unit 408 performs the required computations to measure the time of flight of the LIDAR beam 110, 204 between the transmitter 300 and the receiver 302. The computational unit 408 further uses the time of flight to determine ice accumulation 106, 212 on the aerodynamic surface 216. The one or more processors in the computation unit 408 determine and output ranging data including the travel times of the LIDAR beam 110, 204 from the transmitter 300 to the receiver 302 via one or more different locations P1, P2 swept S1, S2 on the aerodynamic surface 216. Distances from the LIDAR system 104, 202 to the one or more locations P1, P2 on the aerodynamic surface 216 are calculated from the travel times. The distances and/or travel times change as ice 106, 212 accumulates on, or is eliminated from, the aerodynamic surfaces 216.

In various examples, the distances and/or travel times are used to determine a shape 114, 210 of the aerodynamic surface 216. The change in shape 114, 210 of the aerodynamic surface 216 is determined by measuring the variations or differences in distances and/or travel time in real time, continuously, between different times, and/or at different time intervals. Thus, in one example, sweeping the LIDAR beam 110, 204 across the aerodynamic surface 216 measures the shape 114, 210 of the aerodynamic surface 216 in real time. The variations in time of flight are associated with a change in shape 114, 210 of the aerodynamic surface 216 and/or with accumulation, formation, or elimination of ice 106, 212 on the aerodynamic surface 216.

In various examples, the measured shape 114, 210 of the aerodynamic surface 216 is compared with (e.g., subtracted from) tabulated data representing the aerodynamic surface 216 deformation under different conditions. In various examples, the tabulated data is found in look up tables. The different conditions include, but are not limited to, iced aerodynamic surface, anti-iced aerodynamic surface, aerodynamic shape for different aircraft speeds, and aerodynamic surface at different temperatures. The difference between the tabulated data and the LIDAR measured shape then indicates the presence or absence of ice on the aerodynamic surface.

In another example, the unit 408 includes (or is) a laser source providing the light source for the LIDAR beam and connection 412 is an optical fiber.

Figure 5A:
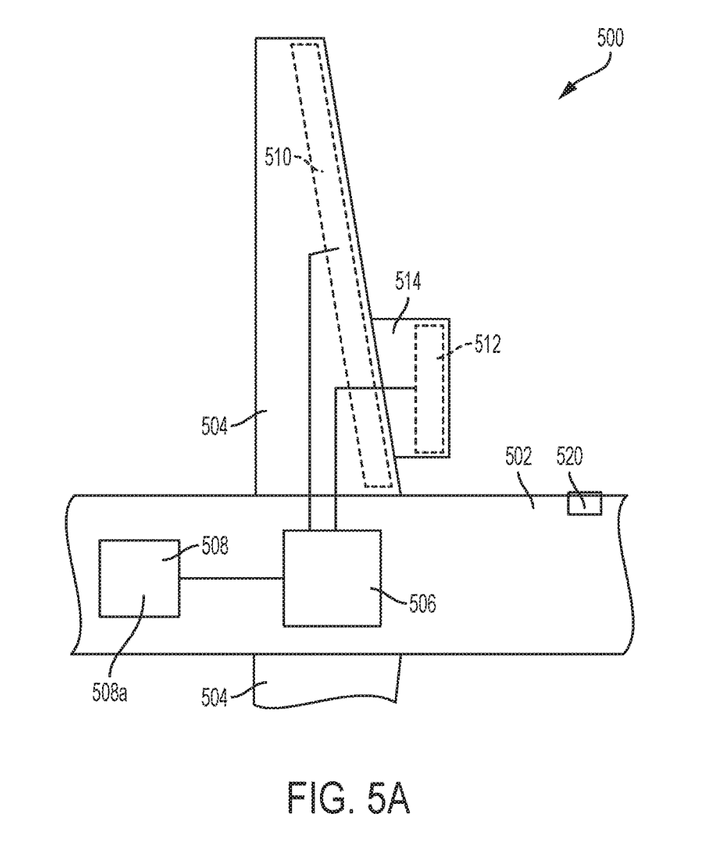
FIG. 5A is a top schematic view of an aircraft with an anti-ice system according to various examples.

FIG. 5A is a schematic view of an aircraft 500, illustrating a portion of the fuselage 502 and the wings 504 of the aircraft 500. The aircraft includes a reservoir 506 of ice protection fluid and a computer or electrical system 508. The ice protection fluid is provided to an anti-ice system 510 (including a porous panel weeping ice protection fluid through orifices or pores) on the wings 504 of the aircraft 500 and to an anti-ice system 512 on engines 514 of the aircraft 500. The anti-ice system 510 on the wings 504 could draw ice protection fluid from the reservoir 606, pass the ice protection fluid through orifices in a leading edge of the wing, recover at least some of the ice protection fluid through apertures in a downstream region of the wing, and return the ice protection fluid to the reservoir 506.

Also shown is LIDAR ice detector 520. The ice detector 520 detects the buildup of ice on the aerodynamic surface. In various aspects, computer or electrical systems 508 onboard the aircraft 500 monitor the ice detector 520 and automatically activate the anti-icing systems 510 and 512 if icing and/or icing conditions are detected.

Figure 5B:
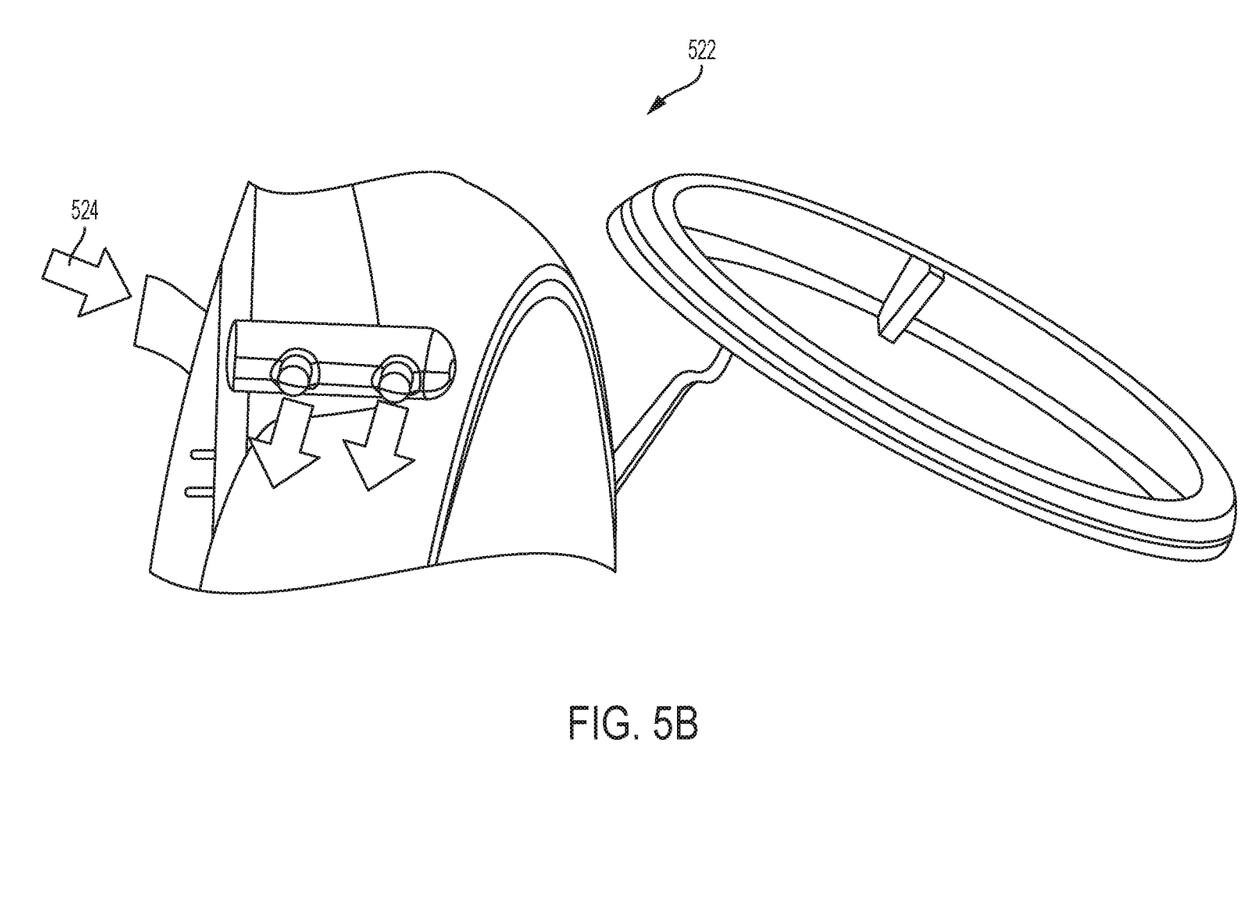
FIG. 5B an illustration of anti-ice bleed air systems using thermal energy.
Figure 5C:
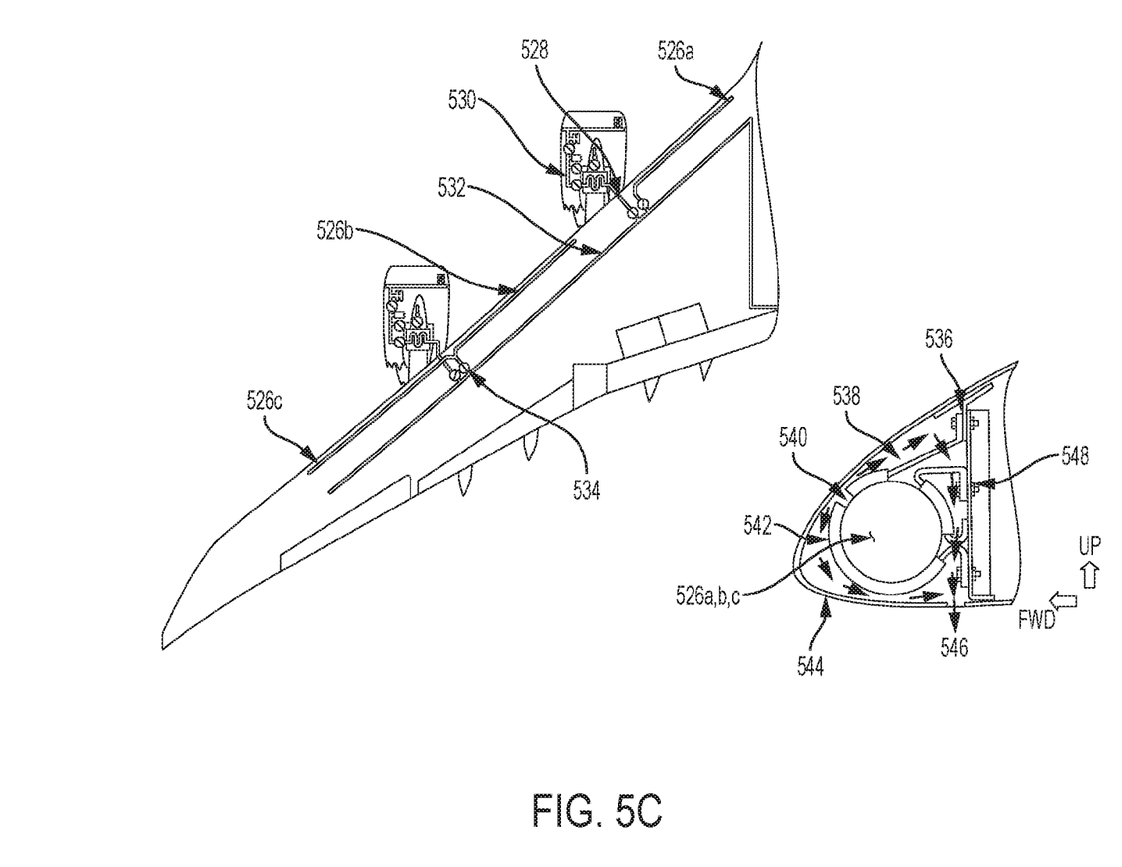
FIG. 5C is an illustration of a wing having a piccolo tube system.

FIG. 5B an illustration of an anti-ice bleed air system 522 using thermal energy and showing entry 524 of hot air into the anti-ice bleed system 522. FIG. 5C is an illustration of a wing having a piccolo tube system, showing a wing thermal anti-ice system comprising spray ducts (inboard spray duct 526a, middle spray duct 526b, outboard spray duct 526c), pressure switch 528 (2 locations), engine bleed air system 530, pneumatic manifold 532, and WTAI valve 534 (4 locations). FIG. 5D is view showing the support 536, strap 538, spray holes 540, cushioned clamp 542, wing nose skin 544, air outlet 546, and fastener 548.

In various examples, the LIDAR ice detector is used to activate, turn, on or monitor the functioning of an anti-ice bleed air system (FIGS. 5B and 5C). In an anti-ice bleed air system, ice protection is provided by a pneumatic swirl system utilizing hot bleed air from the engine core. A small percentage of the core mass flow is extracted between compressor stages, and transferred to a 'D-duct' formed by the inner surface of the nacelle lip and the upstream surface of the forward bulk-head as shown in FIG. 5B. Such systems provide ice protection via thermal flux through the nacelle lipskin and are about 50% efficient, with roughly half of the energy in the high pressure, high temperature bleed air transferred through the metallic lip and about half remaining in the overboard exhaust. FIG. 5C shows an example wherein the wing including the anti-ice bleed air system hays a piccolo tube system.

In various aspects, the computer or electrical systems (including processors) perform the LIDAR processing of time of flight data described above.

LIDAR Detection of Ice Protection Fluid Example

Figure 6:
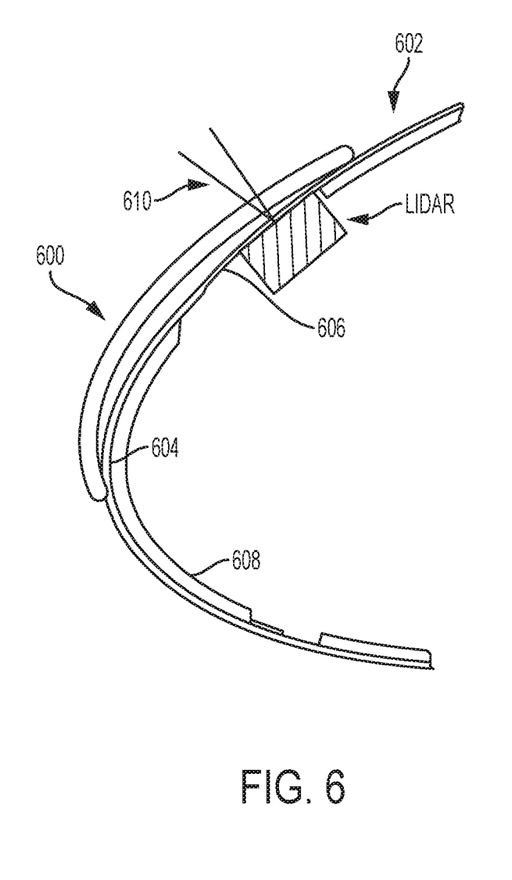
FIG. 6 is a cross-sectional schematic illustrating a LIDAR system installed on an ice prone leading edge according to various examples.

FIG. 6 illustrates a LIDAR system indicating presence of ice protection fluid 600 on an ice prone surface 602, wherein the ice prone surface 602 is a leading edge of an engine inlet. The LIDAR system includes one or more transmitters and one or more receivers flush mounted at (e.g., one or more key points) along the ice-prone surface 602. FIG. 6 further illustrates an anti-icing system including a porous panel 604 on the leading edge. The porous panel 604 (e.g., porous plastic) has an outer skin 106 and an inner skin 108. The outer skin 106 is laser drilled with pores over an active area. The ice protection fluid with weeps out of from the pores on the leading edge of the outer skin 606.

Suspended particulates are added to the ice protection fluid 600. The suspended particles reflect a specific and/or known wavelength of a LIDAR beam 610 when excited by the LIDAR beam emitted from the one or more transmitters. Detection of the specific and/or known wavelength by the one or more receivers in the LIDAR system indicates the presence of ice protection fluid.

In one or more examples, the LIDAR system is a device wholly contained in one unit where the particles are detected. In various other examples, the transmitter and receiver are located on the aerodynamic surface and the computational component and/or laser generator is located elsewhere.

Figure 7:
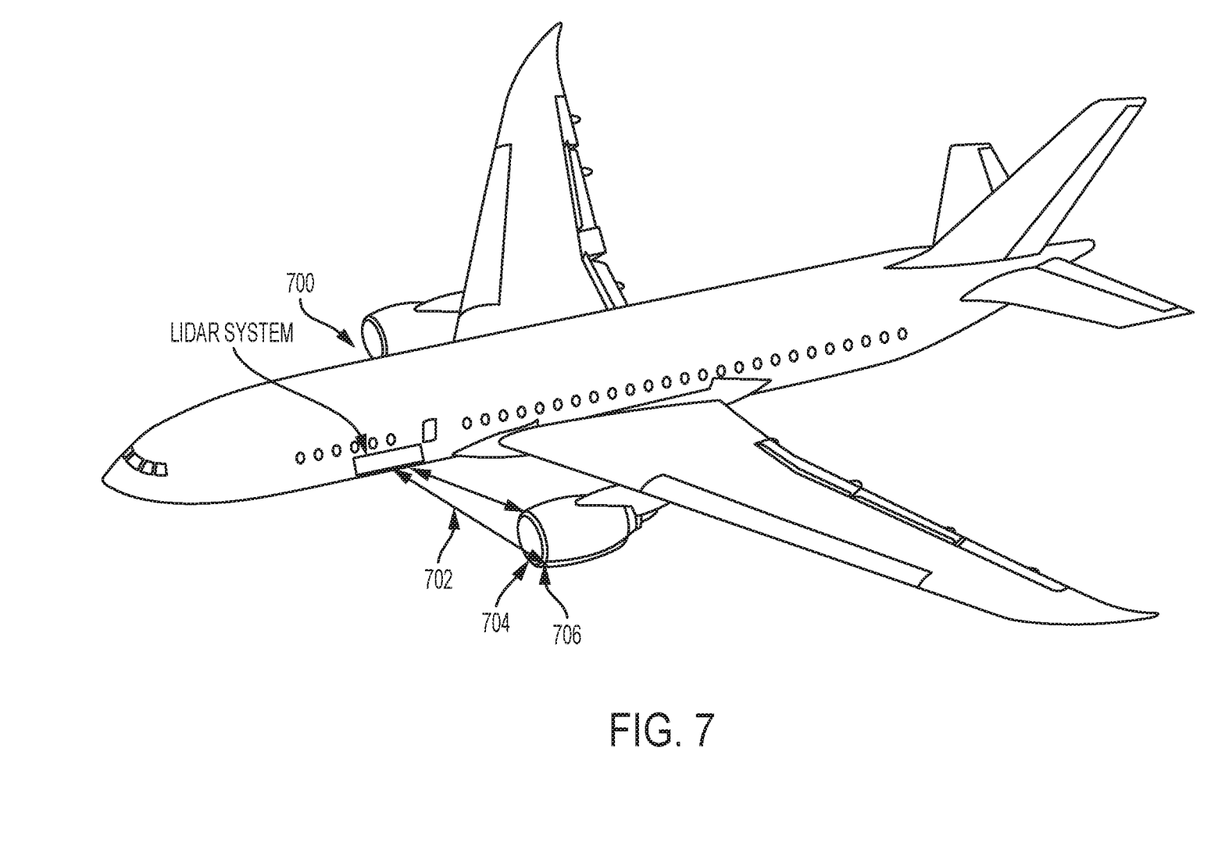
FIG. 7 is a schematic of a LIDAR system installed to sweep an ice-prone engine inlet according to various examples.

FIG. 7 illustrates a LIDAR system mounted in the aircraft's fuselage 700, wherein LIDAR system emits the LIDAR beam 702 sweeping the ice-prone surface of an engine inlet 706 to measure the presence of the ice protection fluid and determine if the ice protection fluid is flowing on the ice prone surface 704. The LIDAR beam detects the presence of the ice protection fluid by measuring the presence of the particles in the ice protection fluid from the LIDAR beam's backscatter.

Figure 8:
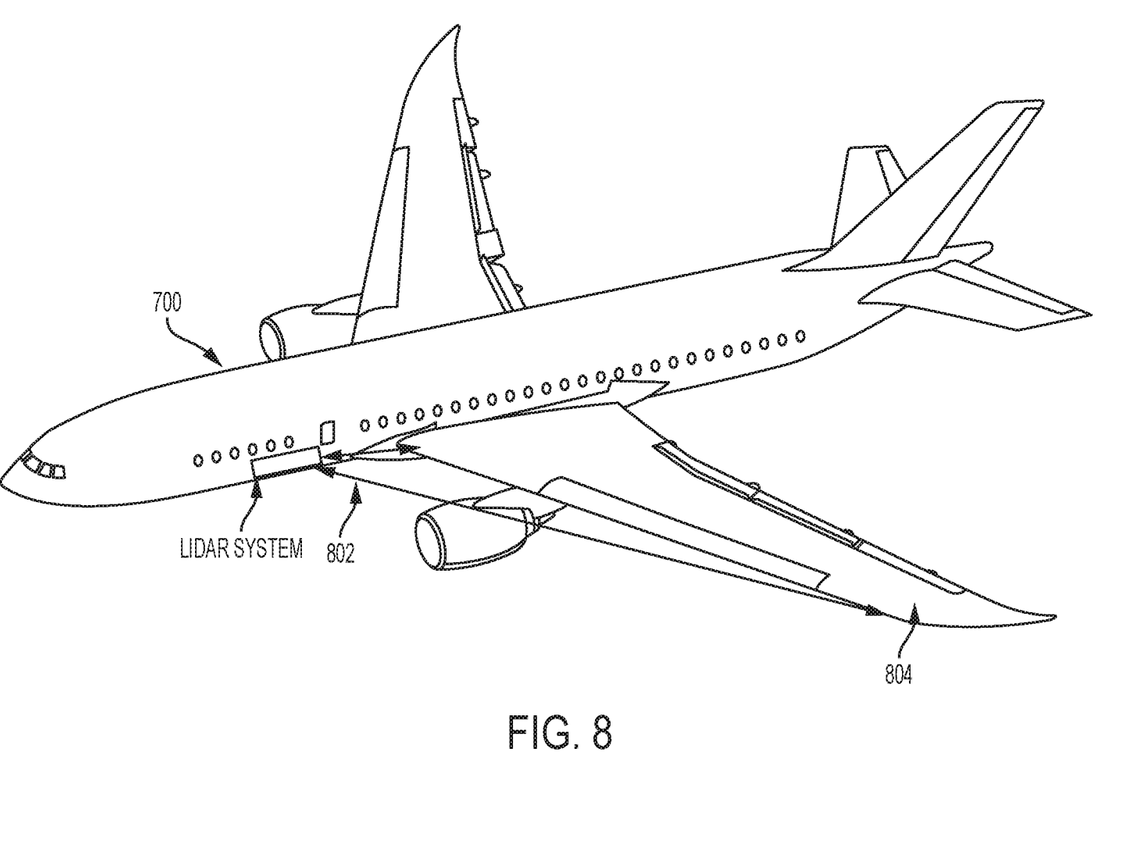
FIG. 8 is a schematic of a LIDAR system installed to sweep an ice-prone wing leading edge according to various examples.

FIG. 8 illustrates a LIDAR system mounted in the aircraft's fuselage 700, wherein LIDAR system emits the LIDAR beam 802 sweeping the ice-prone surface of a wing leading edge 304, to measure the presence of the ice protection fluid and determine if the ice protection fluid is flowing on the ice prone surface 704. The LIDAR system has a longer focal length than the LIDAR system illustrated in FIG. 7. The LIDAR beam detects the presence of the ice protection fluid by measuring the presence of the particles in the ice protection fluid from the LIDAR beam's backscatter.

In one example, if the anti-ice system is activated and the LIDAR system does not detect the suspended particulates within a specified time, the LIDAR system sends the flight crew warning and the crew can then try to find non-icing flight conditions. In one example, the message is an EICAS message.

Process Steps

Figure 9:
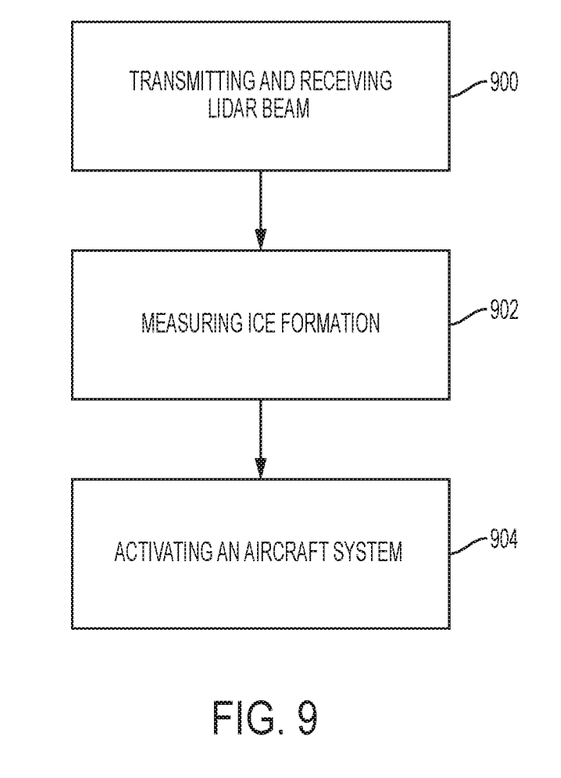
FIG. 9 is a flow chart illustrating a method for using an anti-ice system according to various examples.

FIG. 9 is a flow chart that illustrates a method of detecting ice 106 on ice prone surfaces 602, 704 such as aerodynamic surfaces 216. Examples of aerodynamic surfaces 216 include, but are not limited to, a wing 108, a tail 218, an engine inlet 206, and windshield of an aircraft 102.

Block 900 represents transmitting a LIDAR beam 110, 610, 702 from an aircraft 102 in a sweeping manner S1, S2 onto an aerodynamic surface 216 of the aircraft 102 and detecting the reflection (the return) beam 214 of the LIDAR beam 204 from the aerodynamic surface 216, so that the LIDAR beam 214 detects ice formation 106 on the aerodynamic surface 216. The step includes positioning a LIDAR device (or system) 104, 202 including the transmitter 300 and the receiver 302 inside the aircraft's fuselage 118 behind a window 400, wherein the transmitter 300 transmits the LIDAR beam 110, 610, 204 through the window 400, and the receiver 302 detects the LIDAR beam 214 through the window 400 after the LIDAR beam 204 has reflected off the aerodynamic surface 216 outside the fuselage 118. Since the LIDAR system 104, 202 is positioned inside the aircraft 102, sensitivity of the LIDAR system 104, 202 to the outside environment is reduced as compared to the system placed outside the fuselage.

Block 902 represents measuring one or more times of flight of the LIDAR beam 110, 204, 610 between the transmitter 300 and the receiver 302 via one or more locations P1, P2 on the aerodynamic surface 216; and using the times of flight to measure the accumulation of ice 106, 212. In one example, the times of flight are used to measure the shape 114, 210 of the aerodynamic surface 216. In another example, the step includes measuring variations of the time of flight in real time (or between different times); and using the variations to measure changes in the shape 114, 210 of the aerodynamic surface 216. The changes in shape 114, 210 are associated with the ice formation 106, 212. The changes in shape 114, 210 include, but are not limited to, flexing and/or deformation of the aerodynamic surface 216.

In various examples, sweeping S1, S2 the LIDAR beam 110, 204, 610 across the ice prone surface 602, 704 measures the exact shape 114, 210 (e.g., in three dimensions) of the ice prone surface 602, 704 in real time, allowing a computer 1000,408 to determine if ice 106, 212 is accumulating on the ice prone surface 602, 704 (and how severe the ice build-up is) by comparing the current ice prone surface shape 114, 210 to previous shapes 114, 210 of the ice prone surface 602, 704. Moreover, in various examples, the sweeping LIDAR beam 110, 204 provides a comprehensive indication of ice accumulation 106, 212 across the entire ice prone surface 602, 704, not just at one or more discrete points. In various examples, the actual ice accumulation 106, 212 is measured on the airplane aerodynamic surfaces 216 in a sweeping manner S1, S2 instead of only around sensors.

Block 904 represents activating or deactivating an aircraft system (e.g., anti-ice system 120, 522, 510) in response to detecting (or not detecting) ice formation 106, 212.

In one example, the detection of ice 106, 212 is used to monitor functioning of an anti-ice system 120, 522, 510 used to anti-ice the aerodynamic surface 212. Examples of anti-ice systems whose functioning can be monitored using the LIDAR system include, but are not limited to, bleed air systems 522, Tecalemit-Kilfrost-Sheepbridge (TKS) systems or Freezing Point Depressant (FPD) systems, and pneumatic/mechanical boots.

In one example, the anti-ice system 120, 522, 510 is activated in response to the LIDAR system 104, 202 detecting ice 106, 212 on the aerodynamic surface 216.

In various examples, when the LIDAR system 104, 202 detects ice 106, 212, the flight crew are alerted via a flight deck indication 508a. This allows the flight crew to turn on the anti-ice system 120, 522, 510 themselves or to move the airplane 102 out of the icing condition.

Other aspects may also be used to prevent ice accumulation on other craft, including, but not limited to, military aircraft, rotorcraft, UAVs, and nitrogen recovery systems and cryogenic fuel tanks such as those used on launch vehicles.

Processing Environment

Figure 10:
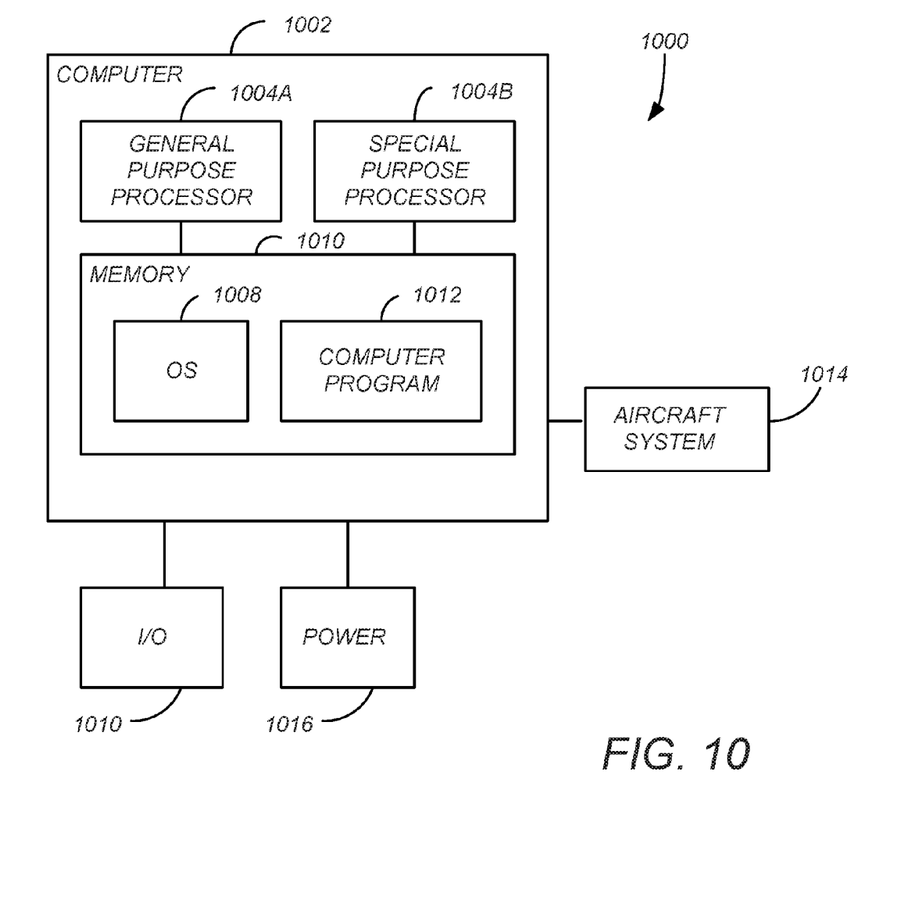
FIG. 10 illustrates a processing environment for implementing one or more embodiments of the LIDAR system described herein.

FIG. 10 illustrates an exemplary system 1000 comprising a computer 1002 that could be used to implement processing elements needed to process the LIDAR data (e.g., obtain the shape 114, 210 from the time of flight data), activate/deactivate the anti-ice system 120, and/or be used as a flight deck indication system. The computer 1002 is typically located on the aircraft.

The computer 1002 comprises a processor (comprising general purpose processor 1004A and special purpose processor 1004B) and a memory, such as random access memory (RAM) 1006. Generally, the computer 1002 operates under control of an operating system 1008 stored in the memory 1006, and interfaces with the user to accept inputs and commands (analog or digital signals) and to present results through an input/output module 1010. The computer program application 1012 accesses and manipulates data stored in the memory 1006 of the computer 1002. The operating system 1008 and the computer program 1012 are comprised of instructions which, when read and executed by the computer 1002, cause the computer 1002 to perform the operations herein described. In one embodiment, instructions implementing the operating system 1008 and the computer program 1010 are tangibly embodied in the memory 1006, thereby making a computer program product or article of manufacture. As such, the terms "article of manufacture," "program storage device" and "computer program product" as used herein are intended to encompass a computer program accessible from any computer readable device or media.

In one embodiment, computer 1002 comprises one or more field programmable gate arrays (FPGAs).

In one embodiment, the computer 1002 receives a signal through I/O 1010 from the LIDAR device 104, 202. In response, the computer 1002 calculates the shape 114, 210 of the aerodynamic surface 216, activates/deactivates the anti ice system 120, and/or alerts the flight crew that the LIDAR has detected ice. The flight crew may turn on or deactivate the anti-ice system 120 and/or move the airplane out of the icing condition in response to the flight deck indication.

FIG. 10 further illustrates a power source 1016 for providing power to the system 1000.

Those skilled in the art will recognize many modifications may be made to this configuration without departing from the scope of the present disclosure. For example, those skilled in the art will recognize that any combination of the above components, or any number of different components, peripherals, and other devices, may be used.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects of the present invention, other and further aspects of the invention may be devised without departing from the basic scope thereof, and the scope thereof is determined by the claims that follow.

What is claimed is:

1. An ice detector for use of an aircraft, comprising:
a Light Detection and Ranging (LIDAR) device comprising a transmitter and a receiver placed on the aircraft, such that the LIDAR device measures a shape of an aerodynamic surface on the aircraft in a sweeping manner to detect ice formation; wherein:
the transmitter transmits a LIDAR beam to the aerodynamic surface such that the LIDAR beam sweeps across the aerodynamic surface,
the receiver detects the LIDAR beam after the LIDAR beam has reflected off the aerodynamic surface,
the LIDAR device measures variations of a time of flight of the LIDAR beam between the transmitter and the receiver in real time,
the LIDAR device uses the variations in the time of flight to measure changes in the a shape of the aerodynamic surface, and
the changes in the shape of the aerodynamic surface are associated with the ice formation on the aerodynamic surface.

2. The ice detector of claim 1, wherein:
the LIDAR device is positioned inside a fuselage behind a window in the aircraft,
the transmitter transmits the LIDAR beam through the window, and
the receiver detects the LIDAR beam through the window after the LIDAR beam has reflected off the aerodynamic surface outside the fuselage.

3. The ice detector of claim 1, further comprising a flight deck indication system alerting flight crew when the ice detector detects ice.

4. The ice detector of claim 1, wherein the aerodynamic surface is a wing.

5. The ice detector of claim 1, wherein the aerodynamic surface is a tail.

6. The ice detector of claim 1, wherein the aerodynamic surface is an engine inlet.

7. An ice detector for use of an aircraft, comprising:
a Light Detection and Ranging (LIDAR) device comprising a transmitter and a receiver placed on two distinct locations on the aircraft, such that the LIDAR device measures a shape of an aerodynamic surface on the aircraft in a sweeping manner to detect ice formation; wherein:
the transmitter transmits a LIDAR beam to the aerodynamic surface,
the receiver detects the LIDAR beam after the LIDAR beam has reflected off the aerodynamic surface,
the LIDAR device measures a time of flight of the LIDAR beam between the transmitter and the receiver and uses the time of flight to measure the shape of the aerodynamic surface, and
the LIDAR device is mounted on two-axis rotation mount so that the sweeping of the LIDAR beam is in two axes and provides a more complete analysis of the ice formation than an ice detector positioned on the aerodynamic surface.

8. A method of detecting ice, comprising:
transmitting a Light Detection and Ranging (LIDAR) beam from an aircraft in a sweeping manner onto an aerodynamic surface of the aircraft, so that the LIDAR beam detects an ice formation on the aerodynamic surface;
measuring, in real time, variations in a time of flight of the LIDAR beam between a transmitter and a receiver;
using the variations to measure changes in a shape of the aerodynamic surface; and
associating the changes in the shape with the ice formation.

9. The method of claim 8, further comprising using the LIDAR beam to monitor functioning of an anti-ice system used to anti-ice the aerodynamic surface.

10. The method of claim 8, further comprising:
detecting the ice formation using the LIDAR beam; and
activating an anti-ice system in response to the detecting.

11. The method of claim 8, further comprising:
positioning a LIDAR device comprising the transmitter and the receiver inside a fuselage behind a window in the aircraft, wherein:
the transmitter transmits the LIDAR beam through the window, and
the receiver detects the LIDAR beam through the window after the LIDAR beam has reflected off the aerodynamic surface outside the fuselage.

12. The method of claim 8, wherein the aerodynamic surface is a wing.

13. The method of claim 8, wherein the aerodynamic surface is a tail.

14. The method of claim 8, wherein the aerodynamic surface is an engine inlet.

15. The method of claim 8, wherein the sweeping of the LIDAR beam provides a more complete analysis of the ice formation than an ice detector positioned on the aerodynamic surface.

16. The method of claim 8, further comprising:
alerting flight crew via a flight deck indication when the LIDAR beam detects the ice formation; and
the flight crew turning on an anti-ice system and/or to moving the aircraft out of an icing condition in response to the flight deck indication.

* * * * *